United States Patent
Grattan

(10) Patent No.: US 10,486,628 B2
(45) Date of Patent: Nov. 26, 2019

(54) VEHICLE BODY STRUCTURE

(71) Applicant: Nissan North America, Inc., Franklin, TN (US)

(72) Inventor: Patrick Grattan, Wixom, MI (US)

(73) Assignee: Nissan North America, Inc., Franklin, TN (US)

( * ) Notice: Subject to any disclaimer, the term of this patent is extended or adjusted under 35 U.S.C. 154(b) by 63 days.

(21) Appl. No.: 15/826,058

(22) Filed: Nov. 29, 2017

(65) Prior Publication Data

US 2019/0161039 A1 May 30, 2019

(51) Int. Cl.
*B60R 19/24* (2006.01)
*B60R 19/02* (2006.01)

(52) U.S. Cl.
CPC ........ *B60R 19/24* (2013.01); *B60R 2019/026* (2013.01)

(58) Field of Classification Search
CPC ......... B60R 19/24; B60R 19/26; B60R 19/34; B62D 21/15; B62D 21/152; B62D 21/155; B62D 25/082
USPC .................. 293/132, 133; 296/187.09, 187.1
See application file for complete search history.

(56) References Cited

U.S. PATENT DOCUMENTS

| | | | | |
|---|---|---|---|---|
| 8,985,258 B1 * | 3/2015 | Midoun | ............... | B62D 25/082 180/274 |
| 9,067,549 B2 * | 6/2015 | Baccouche | .......... | B62D 21/152 |
| 9,120,507 B1 * | 9/2015 | Alwan | ................. | B62D 21/152 |
| 9,365,240 B2 * | 6/2016 | Chang | ................... | B62D 21/152 |
| 10,059,288 B2 * | 8/2018 | Canobbio | ............... | B60R 19/00 |
| 2003/0090099 A1 | 5/2003 | Miyasaka | | |
| 2014/0062129 A1 | 3/2014 | Syed et al. | | |
| 2015/0048650 A1 * | 2/2015 | Gupta | ................... | B62D 21/152 296/187.1 |
| 2015/0191203 A1 * | 7/2015 | Okamoto | ................ | B60R 19/02 296/187.1 |
| 2017/0291645 A1 * | 10/2017 | Nusier | ................. | B62D 21/155 |

FOREIGN PATENT DOCUMENTS

| | | | | |
|---|---|---|---|---|
| DE | 102012007889 A1 * | 10/2013 | .......... | B62D 21/152 |
| JP | 07-025357 A | 1/1995 | | |
| JP | 2002-249079 A | 9/2002 | | |
| JP | 2008-195261 A | 8/2008 | | |
| WO | 2004-106146 A1 | 12/2004 | | |

* cited by examiner

*Primary Examiner* — Jason S Daniels
(74) *Attorney, Agent, or Firm* — Global IP Counselors, LLP

(57) ABSTRACT

A vehicle body structure has a frame element extending forward a vehicle longitudinal direction relative to the vehicle. A wheel is rotatably supported to the frame element. A bumper is attached to a front portion of the frame element. The bumper has a lateral side portion extending in an outboard direction relative to the frame element. A first support bracket extends from the frame element. A floating energy transmitting element is attached to the first support bracket at a location outboard of and spaced apart from the frame element, adjacent to but spaced apart from the bumper, and forward of and spaced apart from the wheel. In response to an impact event with the bumper being contacted by another object at a location outboard of the frame element, the floating energy transmitting element is contacted by the bumper and is moved rearward contacting the wheel.

19 Claims, 15 Drawing Sheets

VEHICLE BODY STRUCTURE

BACKGROUND

Field of the Invention

The present invention generally relates a vehicle body structure that includes a floating energy transmitting element. More specifically, the present invention relates to a vehicle body structure with a floating energy transmitting element installed within an otherwise empty space behind an outboard section of a front bumper, the floating energy transmitting element being configured to facilitate transfer of impact energy during an impact event from the bumper, through the floating energy transmitting element, to the wheel and to a sill structure of the vehicle.

Background Information

Vehicle fenders and bumpers are manufactured in accordance with several design considerations, one such consideration being appearance. Many vehicle include a void or empty space outboard of a vehicle frame, rearward of an outboard section of the bumper and forward of the wheel.

SUMMARY

One object of the present disclosure, is to provide a vehicle with a floating energy transmitting element installed within a void or empty space outboard of a vehicle frame, rearward of an outboard section of the bumper and forward of a front wheel such that during an impact event, impacting forces are transmitted through the floating energy transmitting element and the front wheel to a sill structure of the vehicle.

In view of the state of the known technology, one aspect of the present disclosure is to provide a vehicle body structure with a frame element, a wheel, a bumper, a first support bracket and a floating energy transmitting element. The frame element extends forward from a passenger compartment area of a vehicle and extending in a vehicle longitudinal direction relative to the vehicle. The wheel is rotatably supported to the frame element. The bumper is attached to a front portion of the frame element, the bumper having a lateral side portion extending in an outboard direction relative to the frame element. The first support bracket extends from the frame element. The floating energy transmitting element is attached to the first support bracket at a location outboard of and spaced apart from the frame element, adjacent to but spaced apart from the bumper, and forward of and spaced apart from the wheel such that in response to an impact event with the bumper being contacted by impacting forces at a location outboard of the frame element, the floating energy transmitting element is contacted by the bumper and is moved rearward contacting the wheel.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
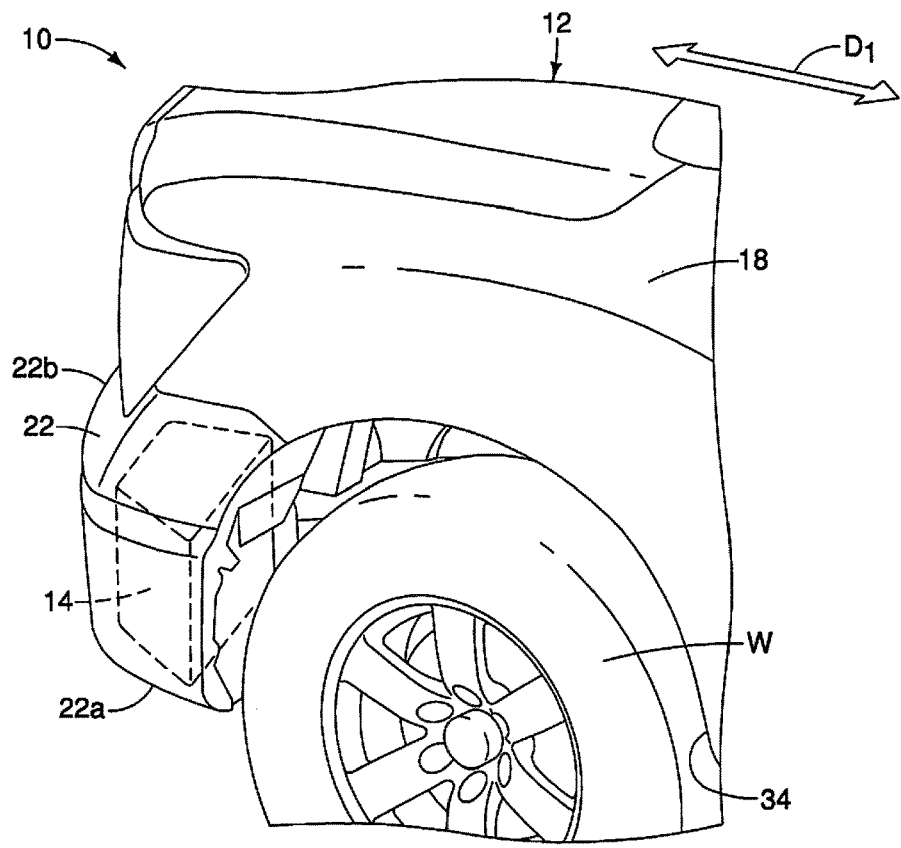
FIG. 1 is a side perspective view of a front portion of a vehicle showing portions of a vehicle body structure including a bumper, a fender, a front wheel and a floating energy transmitting element in accordance with a first embodiment.
Figure 2:
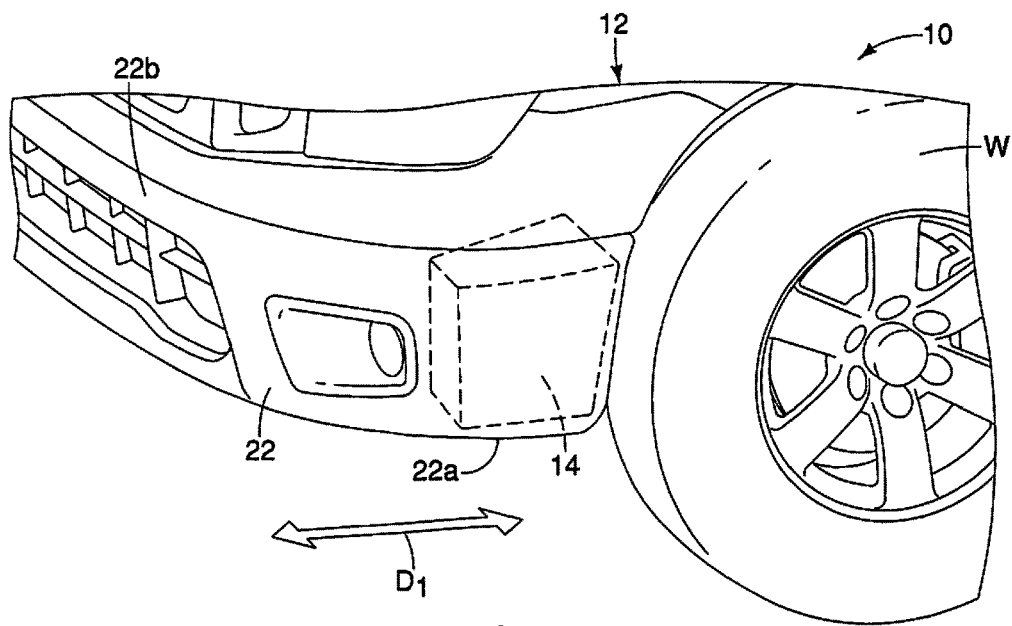
FIG. 2 is another side perspective view of the front portion of the vehicle showing portions of the vehicle body structure including the bumper, the front fender, the front wheel and the floating energy transmitting element in accordance with the first embodiment.

Referring initially to FIGS. 1 and 2, a vehicle 10 having a vehicle body structure 12 with a floating energy transmitting element 14 is illustrated in accordance with a first embodiment. The floating energy transmitting element 14 and its function are described in greater detail below following a description of elements of the vehicle body structure 12.

The vehicle 10 can be any of a variety of vehicle designs, such as a pickup truck, an SUV (sports utility vehicle), a commercial vehicle or a passenger vehicle, such as a four-door sedan or a coupe. In the depicted embodiment, the vehicle body structure 12 includes a frame 16 and a cabin assembly 18. The cabin assembly 18 defines a passenger compartment (not shown), fenders, an engine compartment and other conventional vehicle features. Since cabin assemblies are conventional structures, further description is omitted for the sake of brevity.

In the depicted embodiment, the vehicle 10 has a body-on-frame design construction, where the cabin assembly 18 (vehicle body) removably attaches to and is supported on the frame 16 (also referred to as a vehicle chassis). The engine and transmission (not shown) are supported on and attached to the frame 16 in a conventional manner. However, it should be understood from the drawings and description herein that the vehicle 10 can alternatively have a unibody construction, where the frame and cabin assembly are integrated into a single structure, with various panels and frame elements being welded together.

Figure 7:
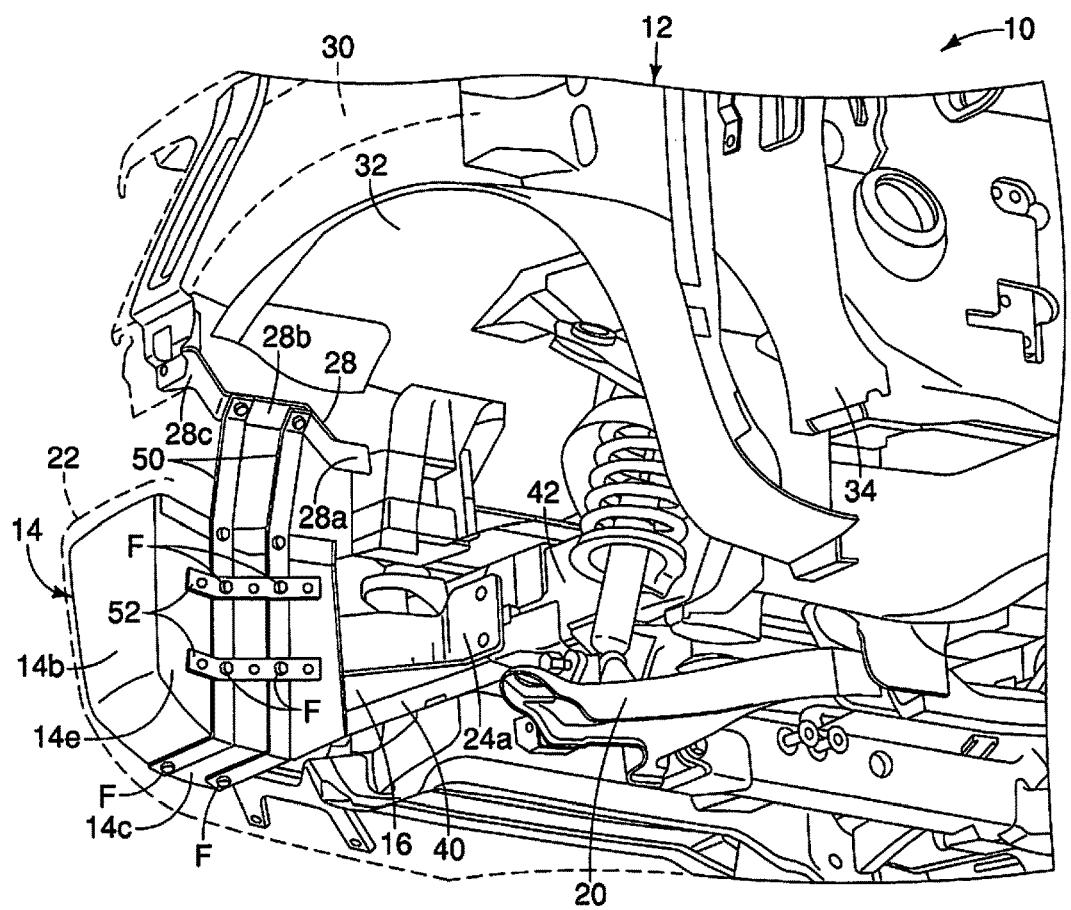
FIG. 7 is another perspective view of the vehicle viewing upward and forward with the bumper and the fender removed showing details of the support brackets that support the floating energy transmitting element in accordance with the first embodiment.
Figure 8:
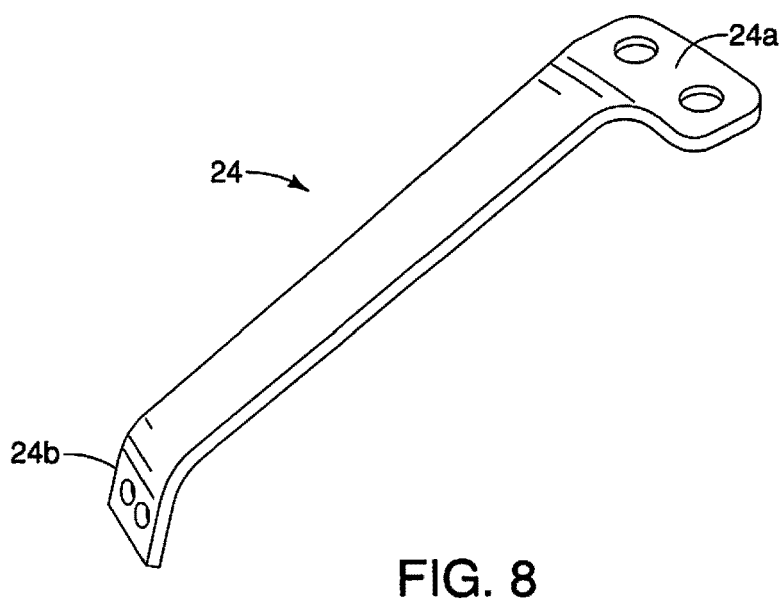
FIG. 8 is a perspective view of one of the support brackets shown removed from the vehicle in accordance with the first embodiment.
Figure 9:
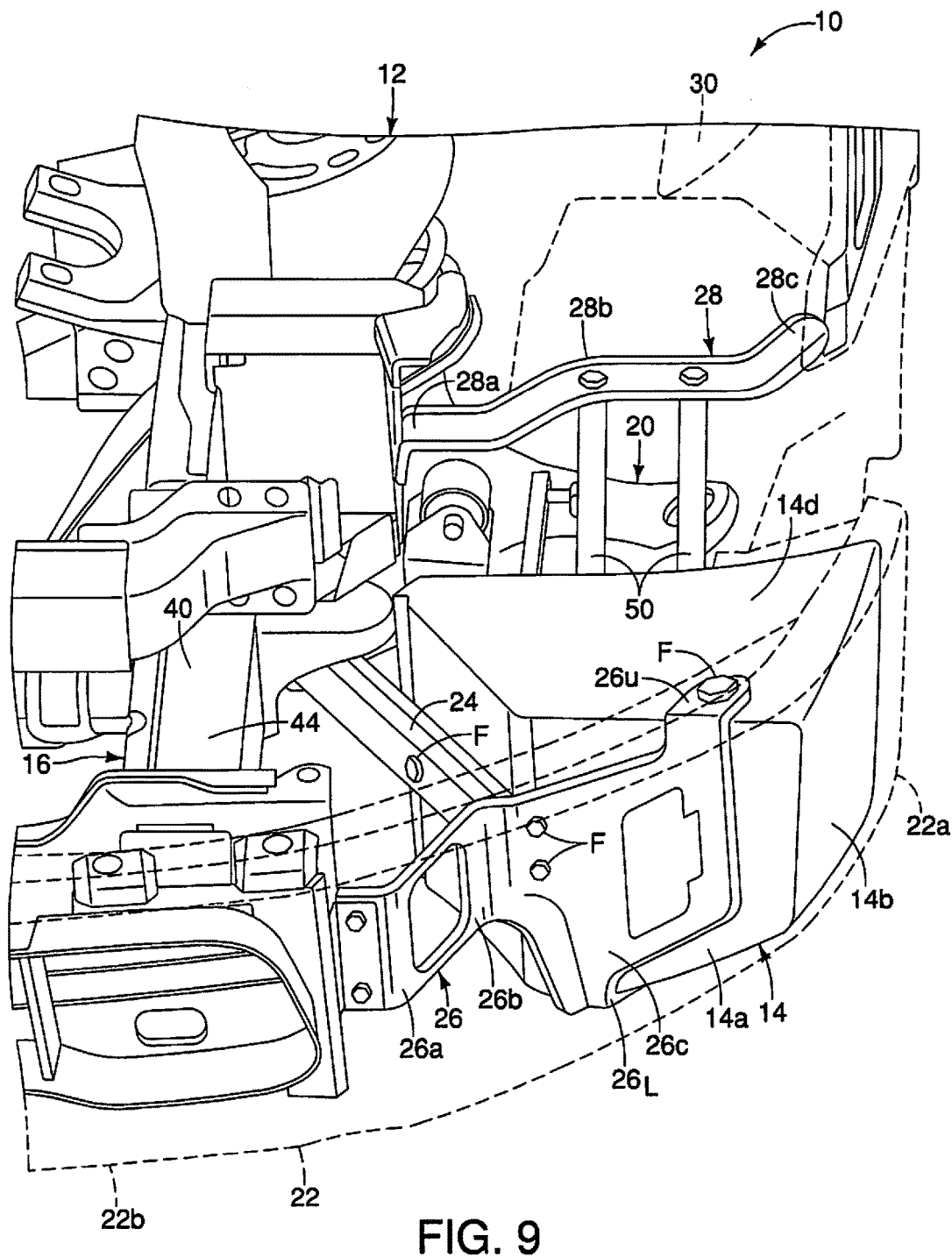
FIG. 9 is another perspective view of the vehicle viewing downward and rearward with the bumper and the fender removed showing details of the support brackets and the floating energy transmitting element in accordance with the first embodiment.
Figure 10:
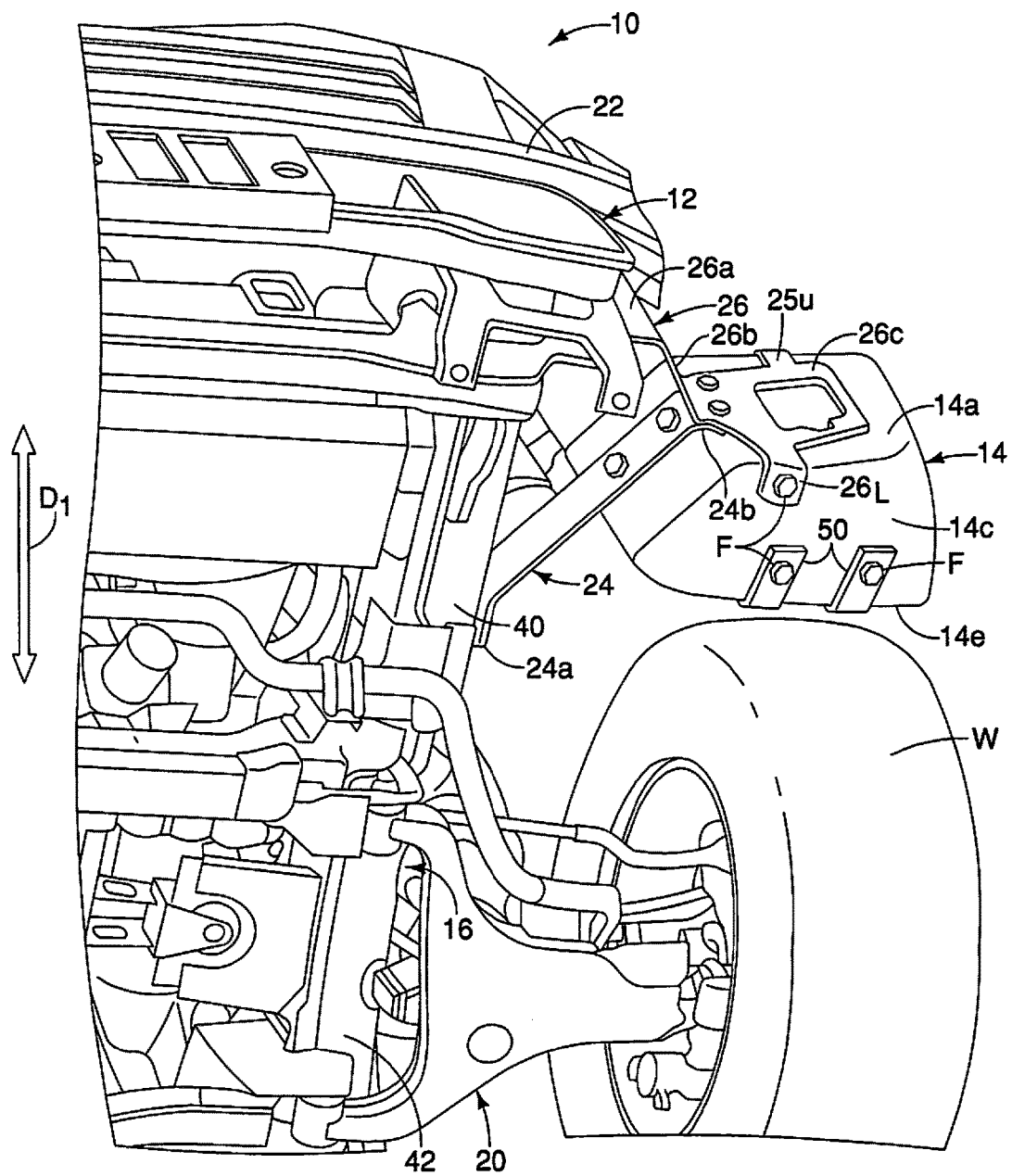
FIG. 10 is another perspective view of the vehicle viewing upward with the bumper and the fender removed showing details of the support brackets and the floating energy transmitting element in accordance with the first embodiment.
Figure 11:
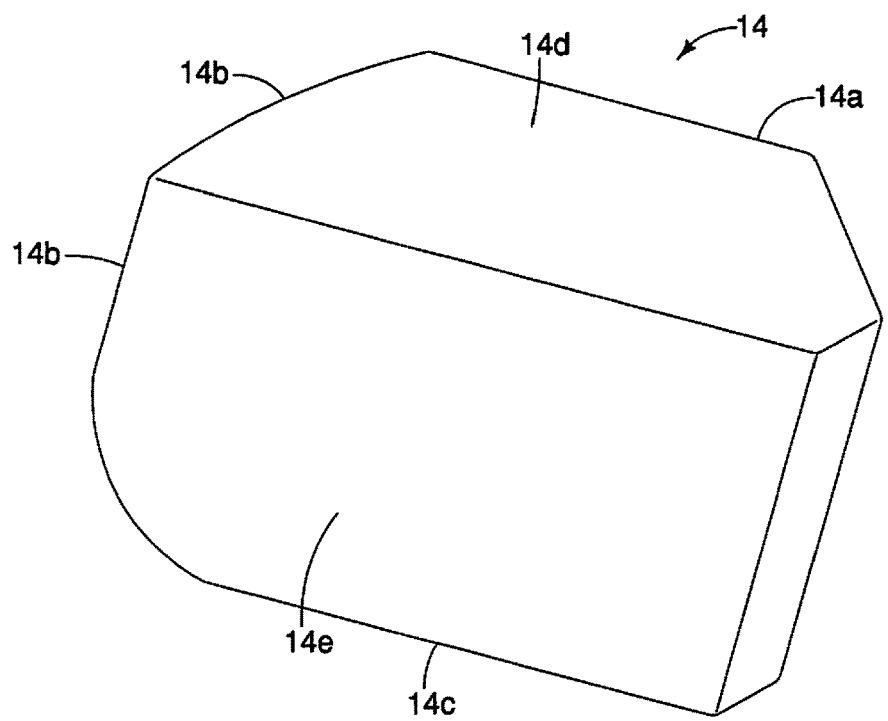
FIG. 11 is a perspective of the floating energy transmitting element shown removed from the vehicle in accordance with the first embodiment.
Figure 12:
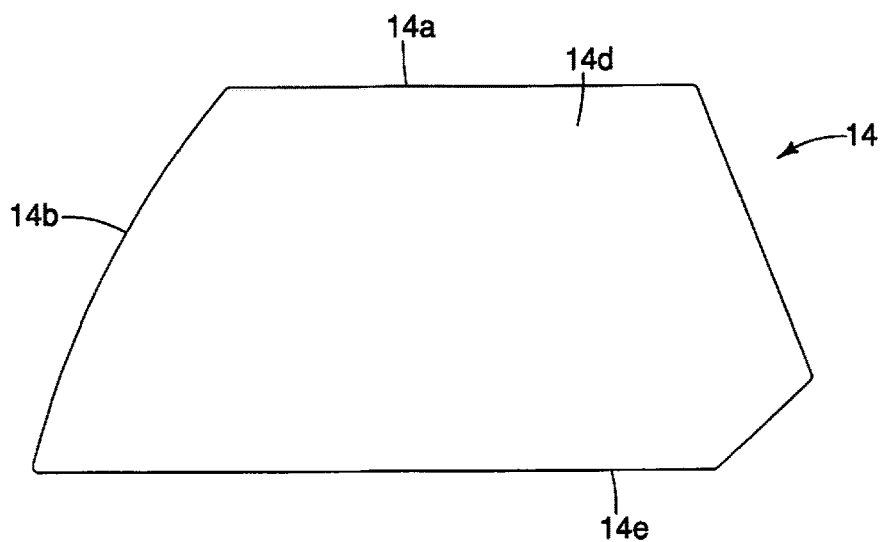
FIG. 12 is a top view of the floating energy transmitting element shown removed from the vehicle in accordance with the first embodiment.

As shown in FIGS. 2-10, the vehicle body structure 12 basically includes, among other elements, the frame 16 (FIGS. 4-7 and 9-10), a wheel support structure 20 (FIGS. 4-6 and 10), a bumper 22 (FIGS. 1-5 and 9-10), a first support bracket 24 (FIGS. 3-4, 6 and 9-10), a second support bracket 26 (FIGS. 3-6 and 9-10), a fender stay 28 (FIGS. 3 and 7), a fender 30 (FIGS. 1, 2 and 6-7), a wheel well skirt 32 (FIGS. 3-5 and 7) and a sill structure 34 (FIG. 7).

As shown in FIGS. 4-7 and 9-10, the frame 16 is a structural assembly that basically supports all of the components of the vehicle 10. The frame 16 extends under the cabin assembly 18 of the vehicle 10. The frame 16 includes a frame element 40 (also sometimes referred to as a front side member) that extends forward from the portion of the cabin assembly 18 that defines the passenger compartment of the vehicle 10. The frame element 40 includes a suspension support portion 42 (shown in FIGS. 5-7 and 10) and a front end 44 that supports the bumper 22 (FIGS. 4-6 and 9-10). The frame element 40 also extends in a vehicle longitudinal direction $D_1$ relative to the vehicle 10.

As shown in FIGS. 4-6 and 10, the wheel support structure 20 is attached to the suspension support portion 42 in a conventional manner. The wheel support structure 20 includes suspension and steering components (not shown) that steer (turn) a wheel W that is supported thereto. The wheel W is rotatably supported to the wheel support structure 20 (front wheel support assembly), and hence to the frame element 40, forward of and spaced apart from the sill structure 34. Further, the wheel W is rotatably supported to the frame element 40 by the wheel support structure 20 such that the wheel W is pivotally supported to the frame element 40 rearward of and spaced apart from the floating energy transmitting element 14.

Since wheel support structures such as the wheel support structures 20, wheel suspension components, steering components and wheels of vehicles are conventional components, further description is omitted for the sake of brevity.

As shown in FIGS. 3-6 and 9-10, the bumper 22 is attached to a front portion or front end 44 of the frame element 40. The bumper 22 has a lateral side portion 22a that extends in an outboard direction from and relative to the frame element 40. The bumper 22 also includes a center portion 22b that extends from side to side along the front of the vehicle 10. The center portion 22b can have an overall curved contour, depending upon the design of the vehicle 10. The lateral side portion 22a of the bumper 22 extends outboard from the center portion 22b, curving in a rearward direction.

The first support bracket 24 (FIGS. 4, 6 and 8-10) has an inboard end 24a that is attached to the frame element 40. The first support bracket 24 extends from the frame element 40 in an outboard and forward direction, as shown in FIGS. 5 and 7. An outboard end 24b of the first support bracket 24 attaches to one or both of the second support bracket 26 and the floating energy transmitting element 14. As shown in FIG. 5, the frame element 40 and the first support bracket 24 define an angle α therebetween, where the angle α is between 30 and 50 degrees. In the depicted embodiment, the angle α is approximately 38 degrees.

As shown in FIGS. 3-6 and 9-10, the second support bracket 26 has an inboard end 26a, a first section 26b and a second section 26c. The inboard end 26a is attached to the front end 44 or front portion 44 of the frame element 40 adjacent to the bumper 22. The first section 26b extends rearward from the inboard end 26a and the second section 26c extends from the first section 26b in an outboard direction away from the frame element 40. As is described in greater detail below, the second section 26c is attached to the floating energy transmitting element 14.

As shown in FIG. 7, the fender stay 28 has an inboard end 28a, a mid-portion 28b and an outboard portion 28c. The inboard end 28a is attached to the vehicle body structure 12 above the frame element 40. The outboard portion 28c is attached to a portion of the fender 30. A pair of straps 50 are attached to the mid-portion 28b of the fender stay 28 and extend downward attaching to the floating energy transmitting element 14, as is described in greater detail below.

The straps 50 can be made of metal, plastic, or other suitable support material. As shown in FIG. 7, the fender stay 28 is supported to the frame element 40 at a location above and rearward of the floating energy transmitting element 14.

The wheel well skirt 32 (FIGS. 4-5 and 7) is a conventional vehicle element that is attached to the frame 16, fender 30 and other elements of the vehicle body structure 12. The wheel well skirt 32 is basically a liner made of plastic or polymer materials that protects the fender 30 and other elements of the vehicle body structure 12 from water and debris coming off from the wheel W, as it rotates. The wheel well skirt 32 extends above and curves around the wheel W. When fully installed within the wheel well of the vehicle body structure 12, the wheel well skirt 32 covers and at least partially conceals the fender stay 28 and the straps 50.

Figure 13:
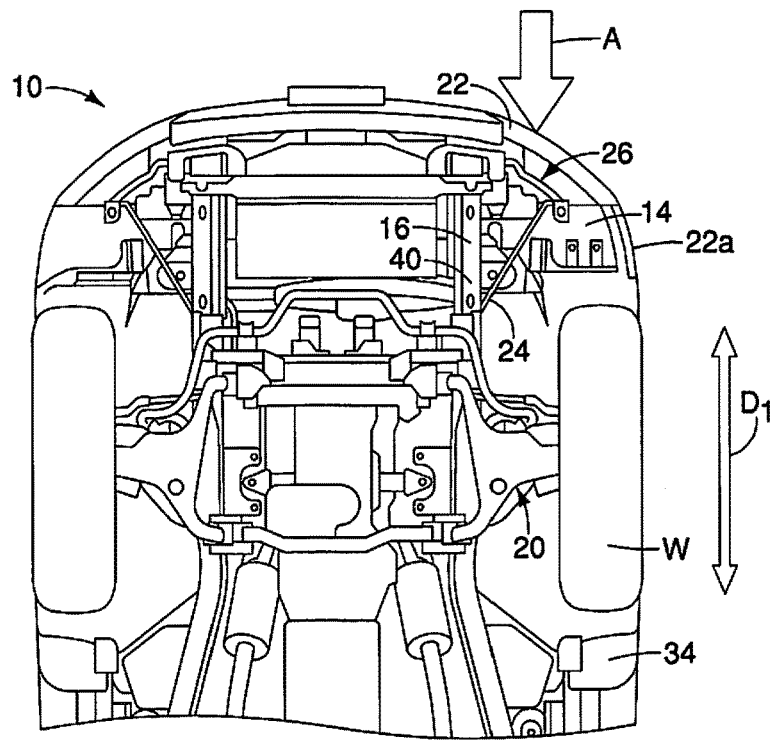
FIG. 13 is a bottom view of the vehicle at the beginning of an impact event where impacting forces are about to act on the bumper, the floating energy transmitting element, the wheel and a sill structure of the vehicle, with the bumper initially being spaced apart from the floating energy transmitting element, the floating energy transmitting element being spaced apart from the wheel, and the wheel being spaced apart from the sill structure in accordance with the first embodiment.
Figure 14:
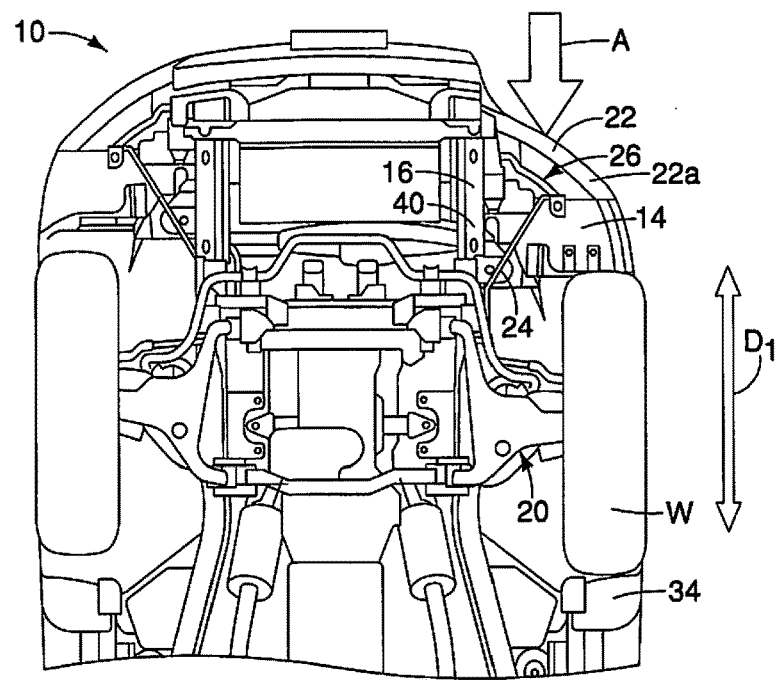
FIG. 14 is another bottom view of the vehicle similar to FIG. 13 after the impact event where impacting forces have deformed the bumper pushing it into contact with the floating energy transmitting element, the impact forces then pushing the floating energy transmitting element into contact with the wheel and pushing the wheel into contact with the sill structure of the vehicle such that impacting forces are imparted to the sill structure in accordance with the first embodiment.
Figure 15:
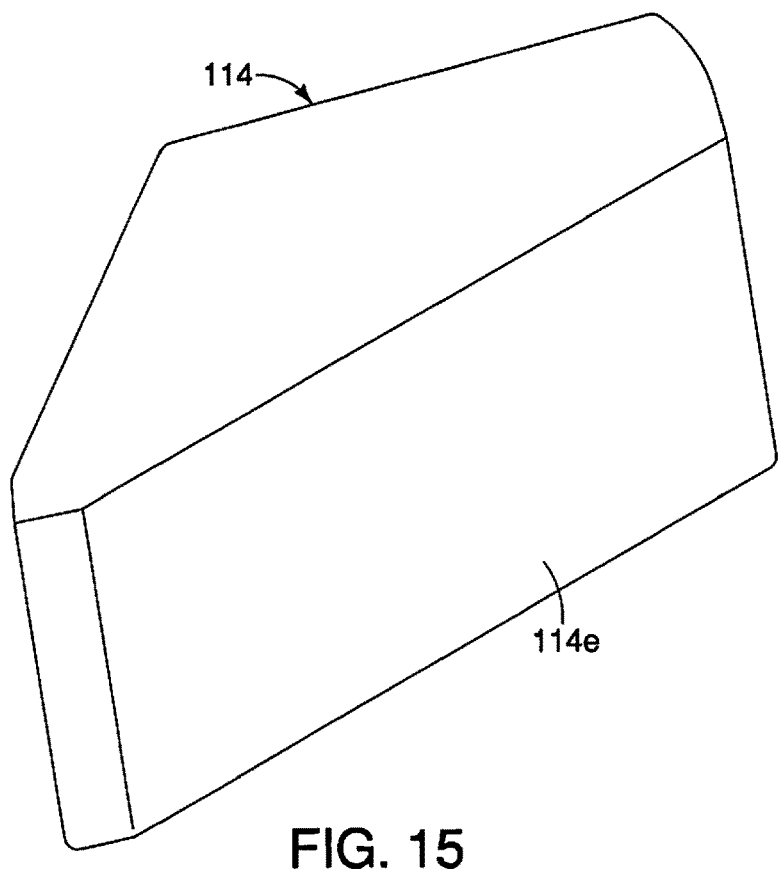
FIG. 15 is a perspective of a floating energy transmitting element shown removed from the vehicle in accordance with a second embodiment.

As shown in FIGS. 7, 13 and 14, the sill structure 34 is connected to the frame 16, and to the frame element 40. The sill structure 34 has a horizontal portion that extends beneath a door opening of the vehicle 10 and a vertical portion that defines a lower section of an A-pillar of the vehicle 10. Since sill structures are conventional vehicle structures, further description is omitted for the sake of brevity.

As shown in FIGS. 1-7 and 9-12, the floating energy transmitting element 14 is installed within a space defined within the vehicle body structure 12 that is otherwise empty (a void). Specifically, the floating energy transmitting element 14 is installed in a space defined outboard of the frame element 40, rearward of center portion 22b of the bumper 22, inboard of the lateral side portion 22a of the bumper 22, and forward of the wheel W.

The floating energy transmitting element 14 includes a forward surface 14a, a lateral outboard surface 14b, a bottom surface 14c, a top surface 14d and a wheel contact surface 14e facing rearward. The floating energy transmitting element 14 is basically concealed by the bumper 22, the fender 30 and the wheel well skirt 32 with the vehicle 10 fully assembled.

The floating energy transmitting element 14 can be made of a foam material having a predetermined density attenuated for transmitting impact energy. More specifically, the floating energy transmitting element 14 can be made of a high density expanded foam material, or an injection molded polypropylene material. Other materials include, for example, plastics, resinous and/or other polymer materials that are light weight, but resist deforming when subjected to compressive forces.

As shown in FIGS. 3, 4, 5 and 9-10, the forward surface 14a of the floating energy transmitting element 14 is attached to and supported by outboard section 24b of the first support bracket 24. The top surface 14d is attached to an upper flange 26$_U$ of the second support bracket 26, where the upper flange 26$_U$ extends upward from the second section 26c of the second support bracket 26.

Figure 4:
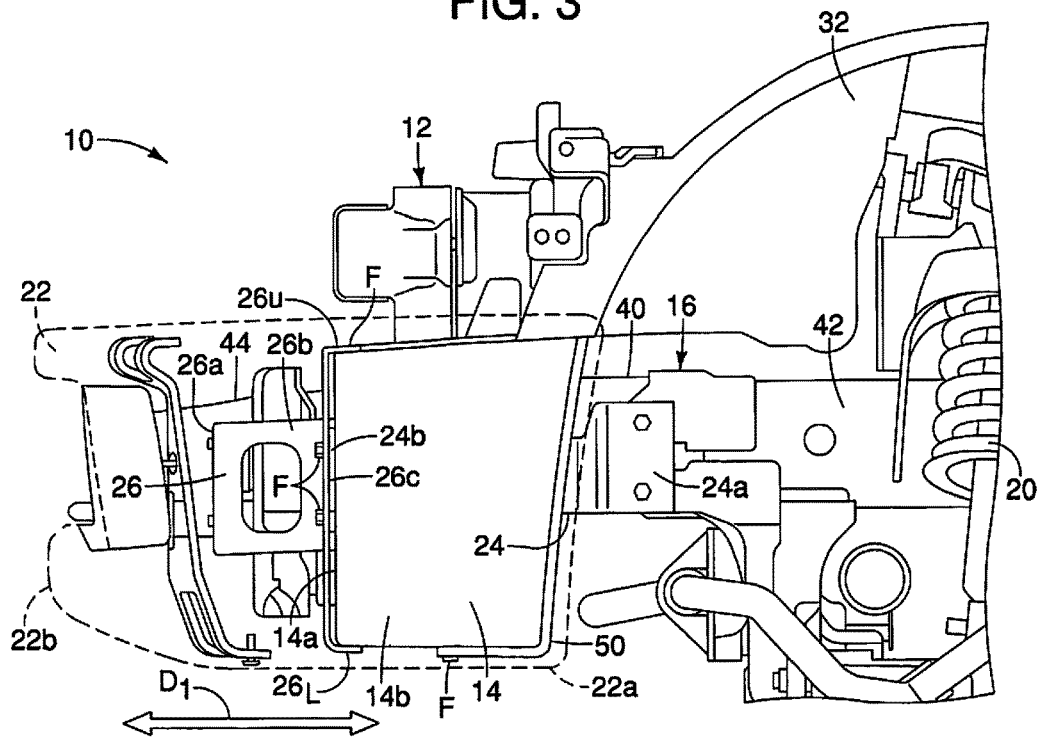
FIG. 4 is a side view of the vehicle with the bumper and the fender removed showing details of the support brackets that support the floating energy transmitting element in accordance with the first embodiment.
Figure 5:
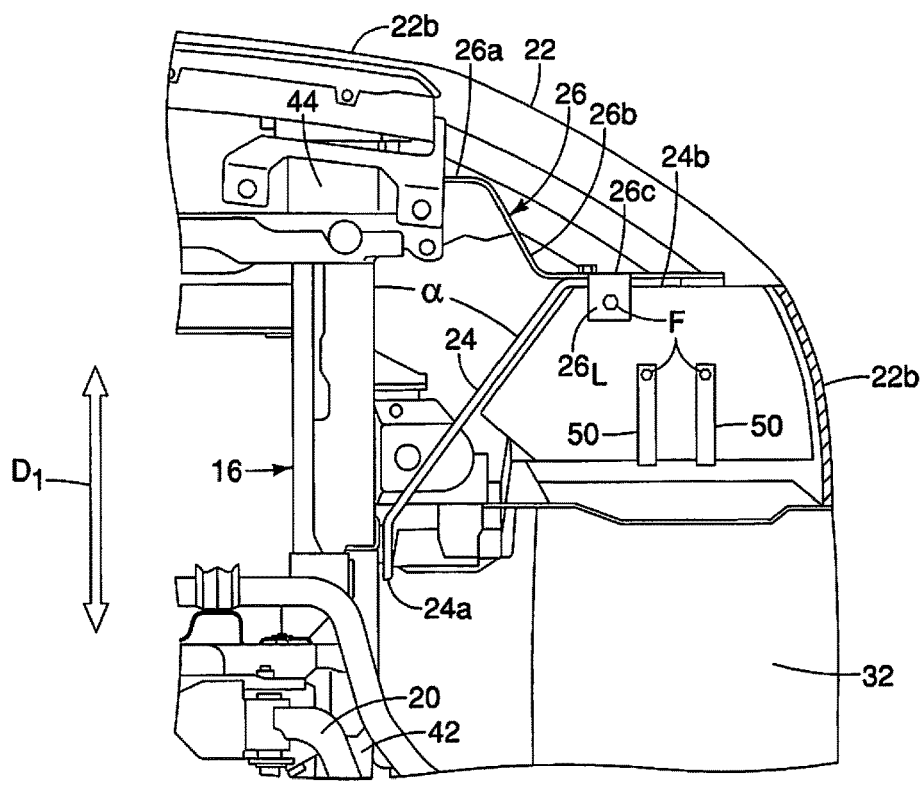
FIG. 5 is a bottom view of the vehicle showing details of the support brackets and the floating energy transmitting element in accordance with the first embodiment.
Figure 6:
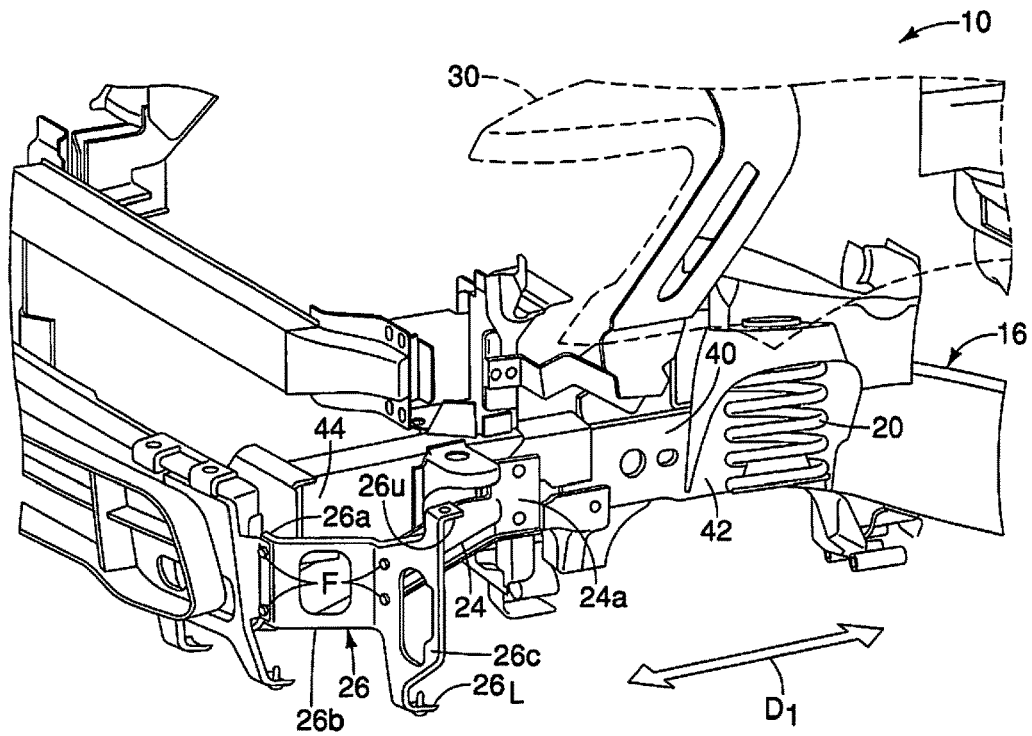
FIG. 6 is a perspective view of the vehicle viewing downward and rearward with the bumper, the fender and the floating energy transmitting element removed showing details of the support brackets that support the floating energy transmitting element in accordance with the first embodiment.

As shown in FIGS. 4, 5 and 7, the bottom surface 14c and the wheel contact surface 14e are attached to the straps 50. As shown in FIG. 7, the straps 50 are fixed to the fender stay 28 and extend down around the wheel contact surface 14e to the bottom surface 14c. As shown in FIG. 7, optional cross-straps 52 can be fixed to the wheel contact surface 14e and the straps 50 thereby further securing the floating energy transmitting element 14 is place. Hence, the floating energy transmitting element 14 is held in position by the first and second support brackets 24 and 26, and the straps 50.

As shown in the drawings, the forward surface 14a of the floating energy transmitting element 14 is spaced apart from the bumper 22. More specifically, the floating energy transmitting element 14 is located rearward and spaced apart from the center portion 22b of the bumper 22. The floating energy transmitting element 14 is also located inboard of and spaced apart from the lateral side portion 22a of the bumper 22, and outboard of and spaced apart from the frame element 40. In the first embodiment, the floating energy transmitting element 14 is supported primarily by the first support bracket 24, the second support bracket 26 and the straps 50 attached to the fender stay 28. The lateral side portion 22a of the bumper 22 has a curved contour that covers and at least partially conceals the lateral outboard surface 14b of the floating energy transmitting element 14, but is not in contact with the floating energy transmitting element 14.

The first support bracket 24, the second support bracket 26 and the straps 50 are made of light gauge metal or plastic that is sufficiently strong enough to retain the floating energy transmitting element 14 in the position depicted in FIGS. 1-7 and 9-10. However, the first support bracket 24, the second support bracket 26 and the straps 50 specifically designed and configured to bend and deform in response to an impact event where force applied from a direction forward of and off-center from the front of the vehicle 10. More specifically, the first support bracket 24, the second support bracket 26 and the straps 50 are configured to guide the floating energy transmitting element 14 into contact with the wheel W in response to impact forces acting on the vehicle 10 where the approximate point of impact is outboard of the frame element 40, as indicated by the arrows A (impact forces A) in FIGS. 13 and 14.

Figure 3:
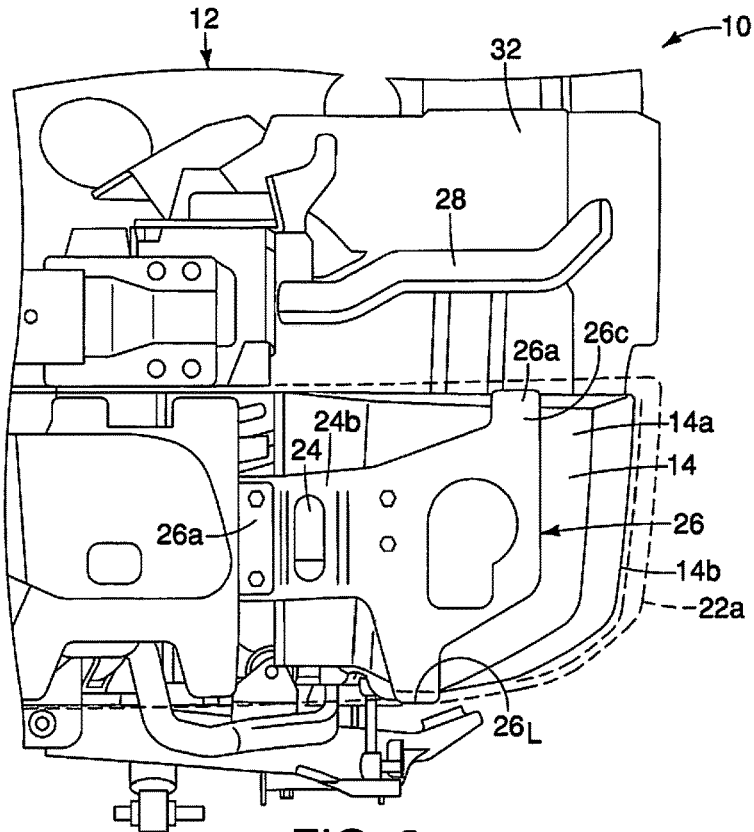
FIG. 3 is a front view of the vehicle with the bumper and the fender removed showing details of support brackets that support the floating energy transmitting element in accordance with the first embodiment.

Hence the floating energy transmitting element 14 is a floating element in that it is not rigidly fixed to the frame 16 or the bumper 22. As shown in FIGS. 3 and 5, in a non-impacted state, the floating energy transmitting element 14 is spaced apart from the lateral side portion 22a of the bumper 22.

As shown by comparing FIGS. 13 and 14, in response to an impact event where impact forces A impact the bumper 22 at a location outboard of the frame element 40, the bumper 22 is deformed (absorbing some of the impact energy A) and moves into contact with the forward surface 14a of the floating energy transmitting element 14, pushing the floating energy transmitting element 14 rearward. The wheel contact surface 14e of the floating energy transmitting element 14 is moved further rearward contacting the wheel W. In the first embodiment, the wheel contact surface 14e of the floating energy transmitting element 14 is perpendicular to the vehicle longitudinal direction $D_1$ and therefore is configured to maintain the wheel W in a straight orientation.

In other words, when the wheel contact surface 14e of the floating energy transmitting element 14 contacts the wheel W, and the wheel W is generally straight guiding the vehicle 10 in the vehicle longitudinal direction $D_1$, contact with the wheel contact surface 14e of the floating energy transmitting element 14 maintains the wheel W in the vehicle longitudinal direction $D_1$. Further, impacting force A transferred to the wheel W can cause the wheel support structure 20 to move or undergo some deformation such that the wheel W is pushed rearward against the sill structure 34, as shown in FIG. 14. With this arrangement, further portions of the impact forces A are at least partially absorbed by the wheel support structure 20, the frame member 40 (the wheel support structure 20 being connected to the frame member 40), the wheel W itself absorbing compression forces, and the sill structure 34. Hence, the wheel contacting surface of the floating energy transmitting element 14 is configured to direct movement of the wheel W to the sill structure 34 in response to the impact event and corresponding impact forces A.

In the first embodiment, the floating energy transmitting element 14 is secured to the first support bracket 24, the second support bracket 26 and the straps 50 via fasteners F. Since the floating energy transmitting element 14 is made of a light weight material, the fasteners F are secured to their respective attachment flanges of the first support bracket 24, the second support bracket 26 and the straps 50 and can merely extend into the foam material that defines the floating energy transmitting element 14. Specifically, depending upon the material used to form the floating energy transmitting element 14, it is sufficient to have the fasteners F extend into the floating energy transmitting element 14 in order to retain the floating energy transmitting element 14 in place.

Second Embodiment

Referring now to FIGS. 15-18, a floating energy transmitting element 114 installed in a vehicle 110 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the second embodiment, the vehicle 110 is identical to the vehicle 10 of the first embodiment except that the vehicle 110 has been modified such that the floating energy transmitting element 14 is replaced with the floating energy transmitting element 114. Further, the wheel support structure 20 is replaced with a wheel support structure 120. The wheel support structure 120 is configured such that during an impact event, impact forces A tend to cause the wheel W to turn in a counterclockwise direction due to biasing of the wheel support structure 120, inducing a torque $T_1$ on the wheel W. To counteract the torque $T_1$, the floating energy transmitting element 114 has a wheel contact face 114e that is not perpendicular to the vehicle longitudinal direction $D_1$. Consequently, in response to impact forces A acting on the floating energy transmitting element 114, when the wheel contact surface 114e of the floating energy transmitting element 114 contacts the wheel W, the wheel W is urged to an orientation that steers the vehicle 110 in a direction corresponding or almost corresponding to the vehicle longitudinal direction $D_1$.

Figure 16:
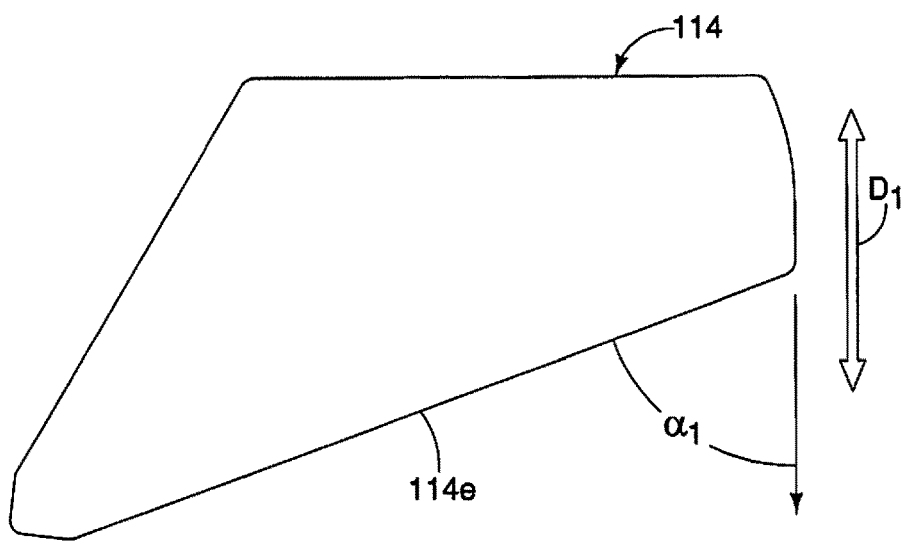
FIG. 16 is a top view of the floating energy transmitting element shown removed from the vehicle in accordance with the second embodiment.
Figure 17:
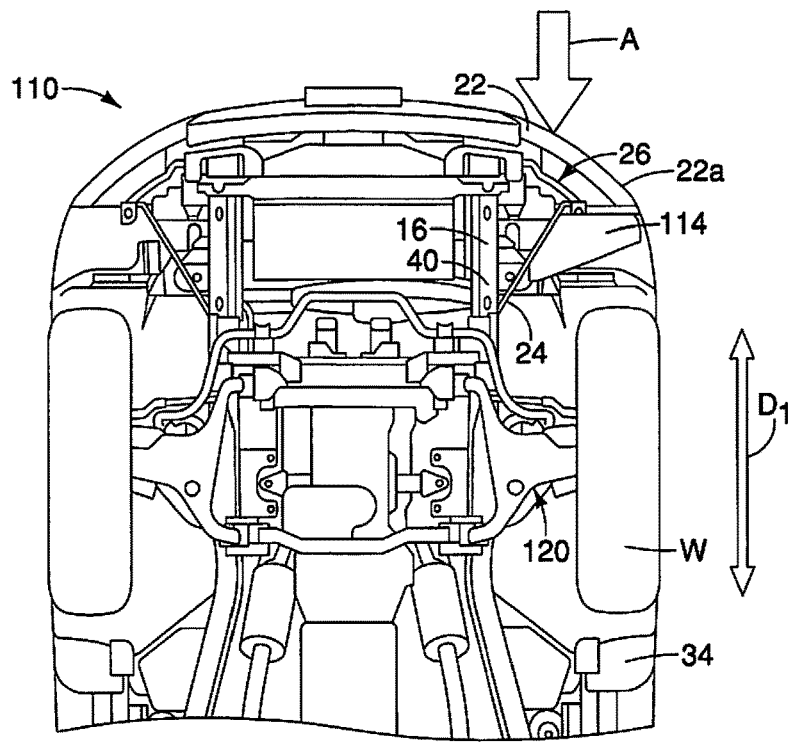
FIG. 17 is a bottom view of the vehicle at the beginning of an impact event where impacting forces are about to act on the bumper, the floating energy transmitting element, the wheel and a sill structure of the vehicle, with the bumper initially being spaced apart from the floating energy transmitting element, the floating energy transmitting element being spaced apart from the wheel, and the wheel being spaced apart from the sill structure in accordance with the second embodiment.
Figure 18:
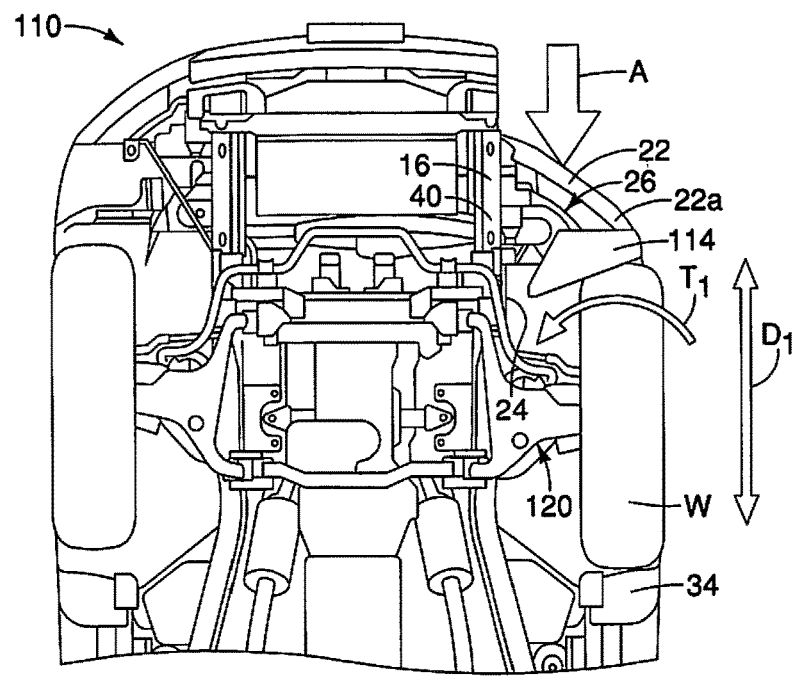
FIG. 18 is another bottom view of the vehicle similar to FIG. 17 after the impact event where impacting forces have deformed the bumper pushing it into contact with the floating energy transmitting element, the impact forces then pushing the floating energy transmitting element into contact with the wheel such that an angled wheel contact surface of the floating energy transmitting element acts against turning forces acting on the wheel and further pushing the wheel into contact with the sill structure of the vehicle such that impacting forces are imparted to the sill structure in accordance with the second embodiment.
Figure 19:
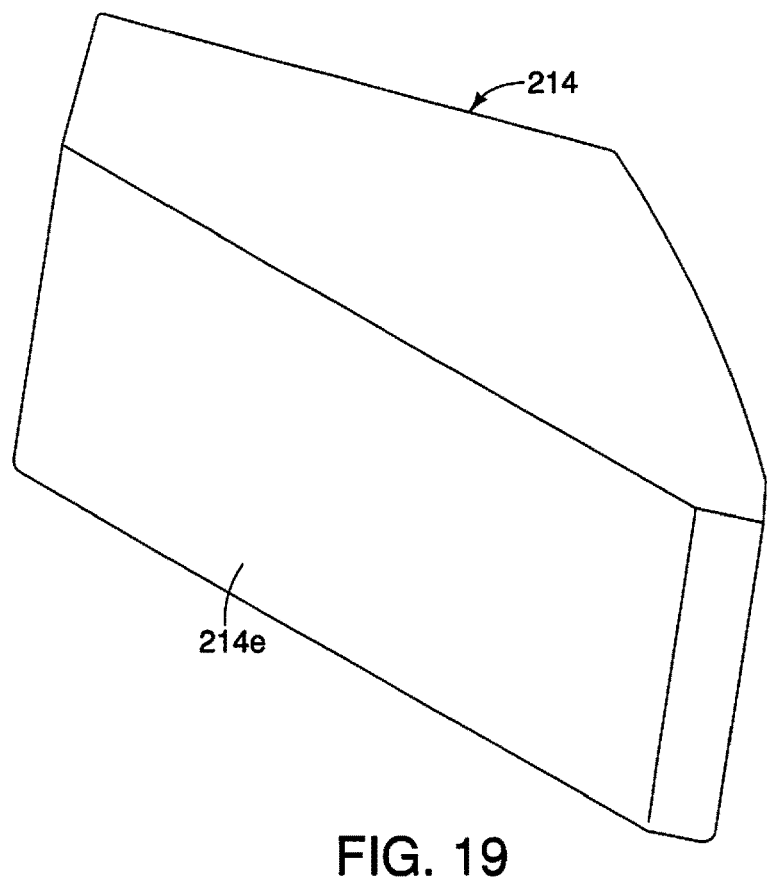
FIG. 19 is a perspective of a floating energy transmitting element shown removed from the vehicle in accordance with a third embodiment.

As shown in FIG. 16, the wheel contact surface 114e and the vehicle longitudinal direction. $D_1$ define an acute angle $\gamma_1$ therebetween such that in response to the impact event off-center steering of the wheel W is restricted. In other words, the acute angle $\gamma_1$ defined by the wheel contact surface 114e combined with the impact forces A acting thereon and on the wheel W, restrict, limit and/or prevent the wheel W from turning.

Third Embodiment

Referring now to FIGS. 19-22, a floating energy transmitting element 214 installed in a vehicle 210 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity:

In the third embodiment, the vehicle 210 is identical to the vehicle 10 of the first embodiment except that the vehicle 210 has been modified such that the floating energy transmitting element 14 is replaced with the floating energy transmitting element 214. Further, the wheel support structure 20 is replaced with a wheel support structure 220. The wheel support structure 220 is configured such that during an impact event, impact forces A tend to cause the wheel W to turn in a clockwise direction due to biasing of the wheel support structure 220, inducing a torque $T_2$ on the wheel W. To counteract the torque $T_2$, the floating energy transmitting element 214 has a wheel contact face 214e that is not perpendicular to the vehicle longitudinal direction $D_1$. Consequently, in response to impact forces A acting on the floating energy transmitting element 214, when the wheel contact surface 214e of the floating energy transmitting element 214 contacts the wheel W, the wheel W is urged to an orientation that steers the vehicle 210 in a direction corresponding or almost corresponding to the vehicle longitudinal direction $D_1$.

Figure 20:
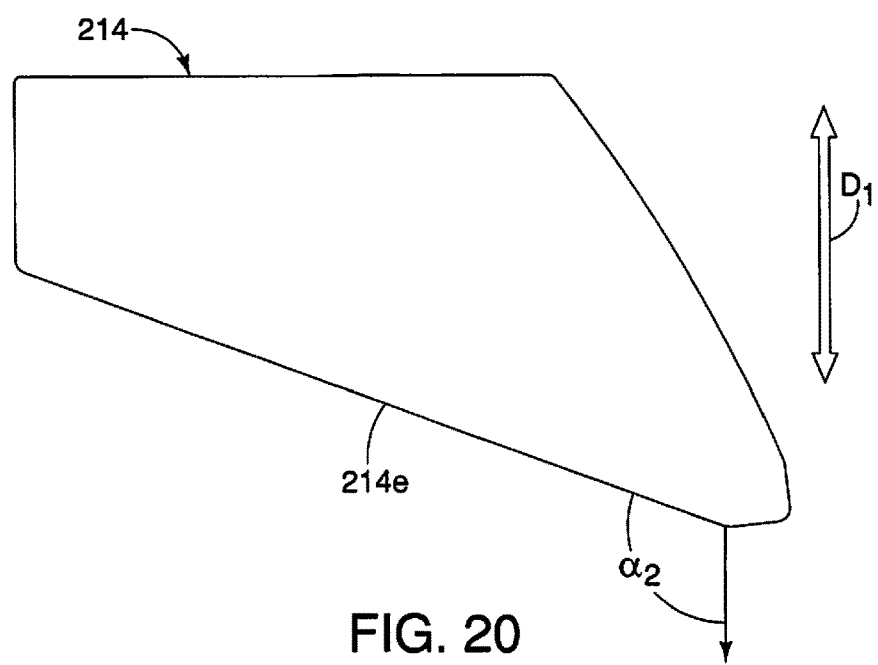
FIG. 20 is a top view of the floating energy transmitting element shown removed from the vehicle in accordance with the third embodiment.
Figure 21:
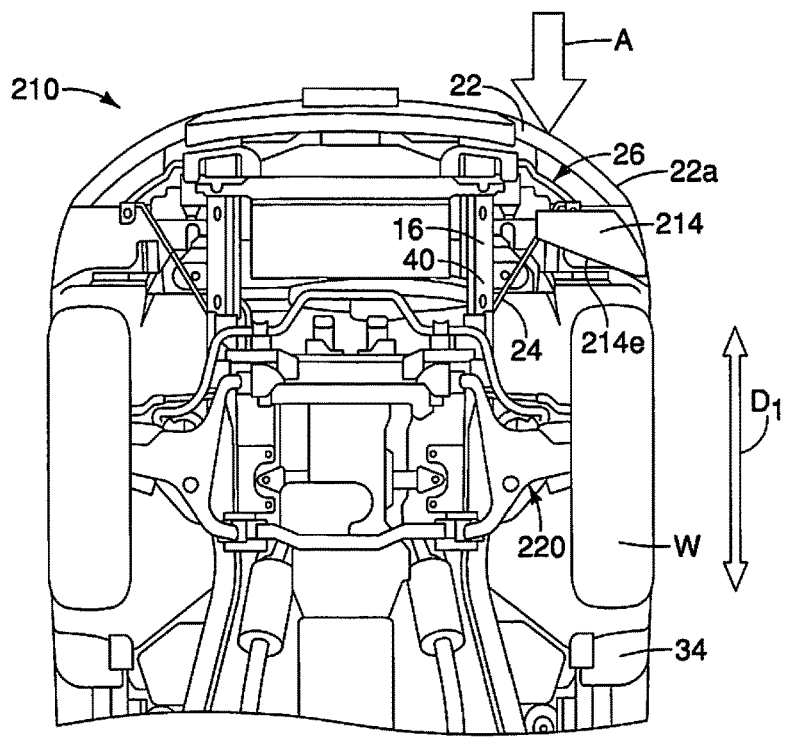
FIG. 21 is a bottom view of the vehicle at the beginning of an impact event where impacting forces are about to act on the bumper, the floating energy transmitting element, the wheel and a sill structure of the vehicle, with the bumper initially being spaced apart from the floating energy transmitting element, the floating energy transmitting element being spaced apart from the wheel, and the wheel being spaced apart from the sill structure in accordance with the third embodiment.
Figure 22:
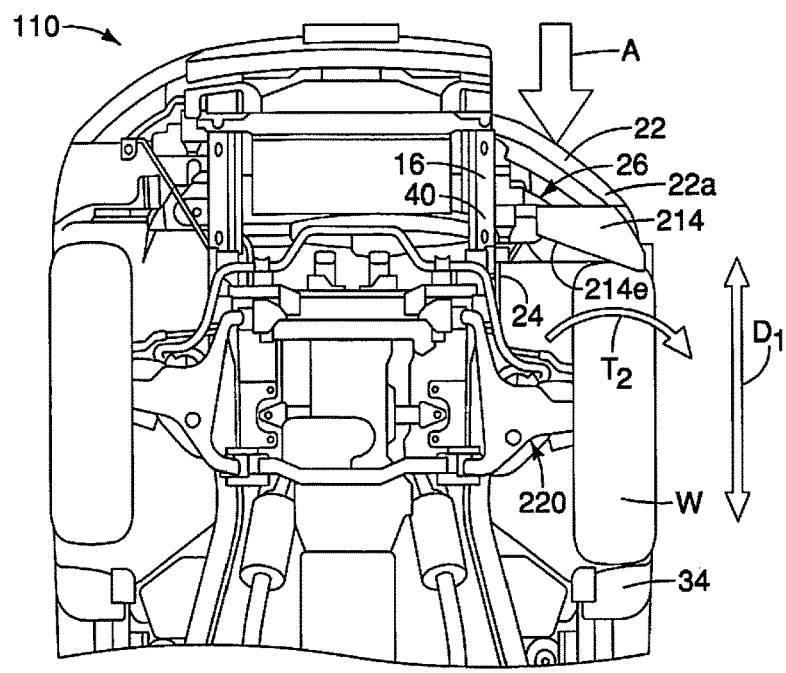
FIG. 22 is another bottom view of the vehicle similar to FIG. 21 after the impact event where impacting forces have deformed the bumper pushing it into contact with the floating energy transmitting element, the impact forces then pushing the floating energy transmitting element into contact with the wheel such that an angled wheel contact surface of the floating energy transmitting element acts against turning forces acting on the wheel and further pushing the wheel into contact with the sill structure of the vehicle such that impacting forces are imparted to the sill structure in accordance with the third embodiment.

As shown in FIG. 20, the wheel contact surface 214e and the vehicle longitudinal direction $D_1$ define an obtuse angle $\gamma_2$ therebetween such that in response to the impact event off-center steering of the wheel W is restricted. In other words, the obtuse angle $\gamma_2$ defined by the wheel contact surface 114e combined with the impact forces A acting thereon and on the wheel W, restrict, limit and/or prevent the wheel W from turning.

Fourth Embodiment

Referring now to FIGS. 23-26, a vehicle 310 in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

In the fourth embodiment, the vehicle 310 includes all of the features of the vehicle 10 of the first embodiment, except that the second support bracket 26 has been replaced with a second support bracket 326 (modified), the straps 50 can optionally be eliminated, and the wheel well skirt 32 has been replaced with a modified wheel well skirt 332 in a manner described in greater detail below.

Figure 23:
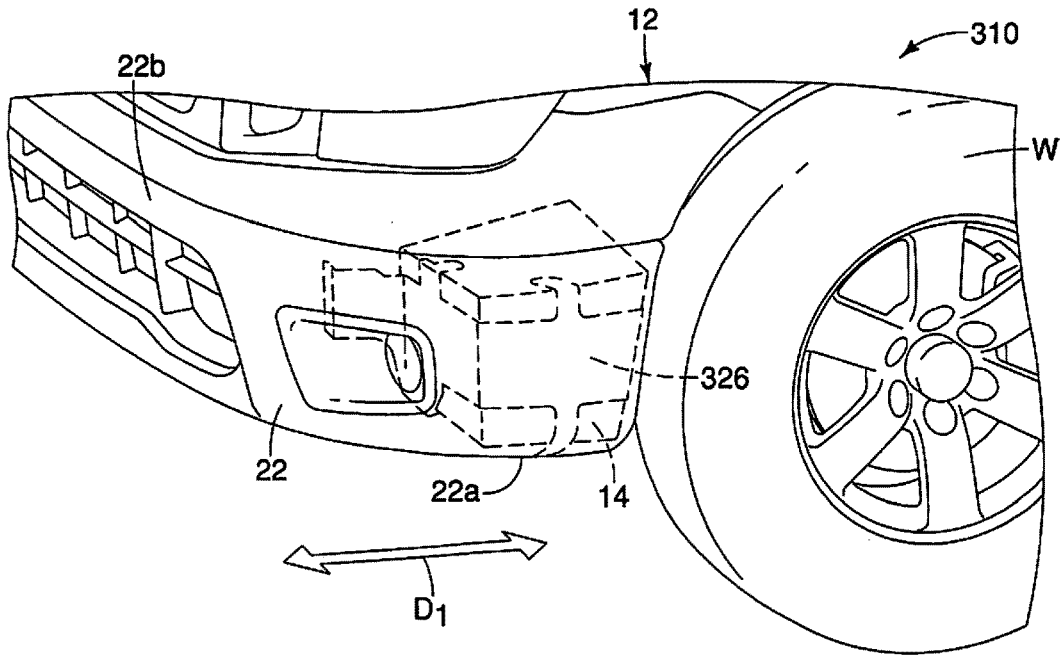
FIG. 23 is a side perspective view of the front portion of the vehicle showing portions of the vehicle body structure including the bumper, the front fender, the front wheel and the floating energy transmitting element in accordance with a fourth embodiment.
Figure 24:
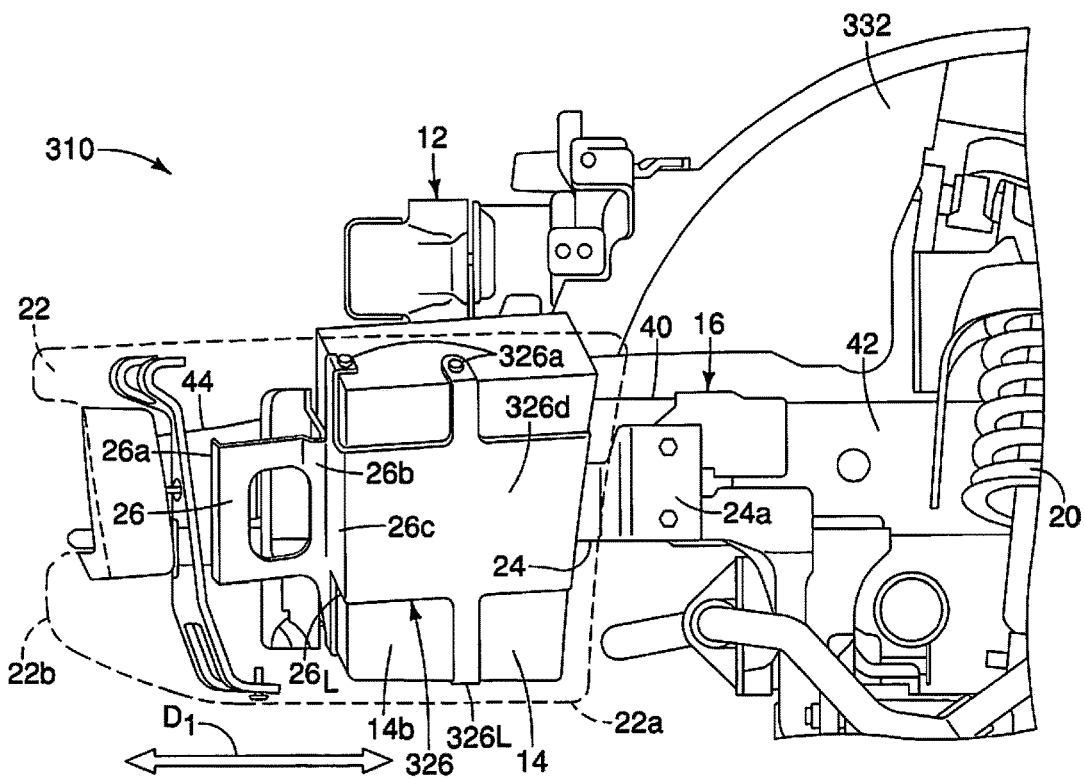
FIG. 24 is a side view of the vehicle with the bumper and the fender removed showing details of a support brackets that supports the floating energy transmitting element in accordance with the fourth embodiment.
Figure 25:
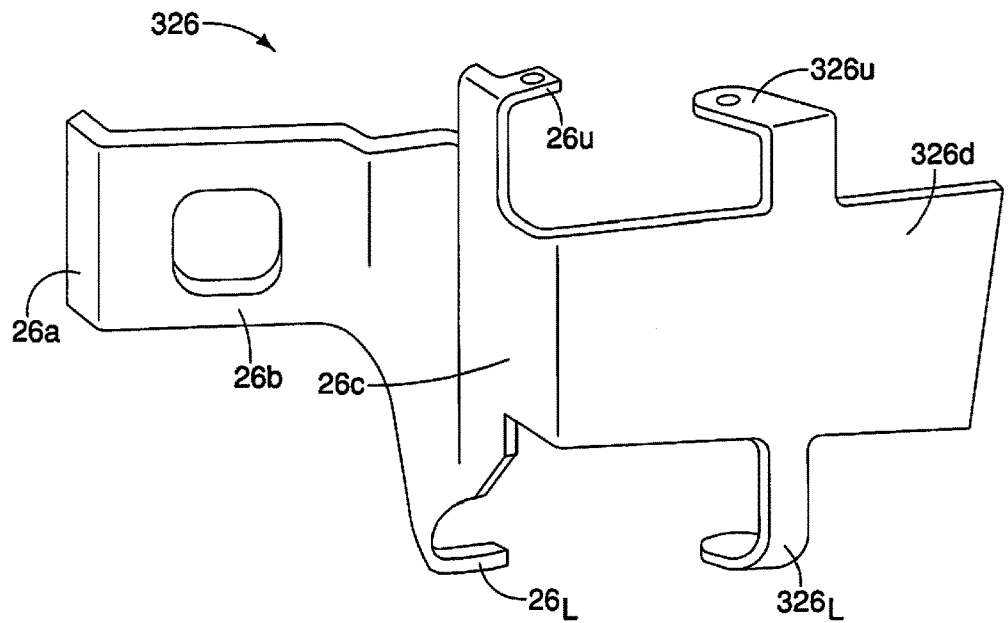
FIG. 25 is a perspective view of the support bracket shown removed from the vehicle in accordance with the fourth embodiment.
Figure 26:
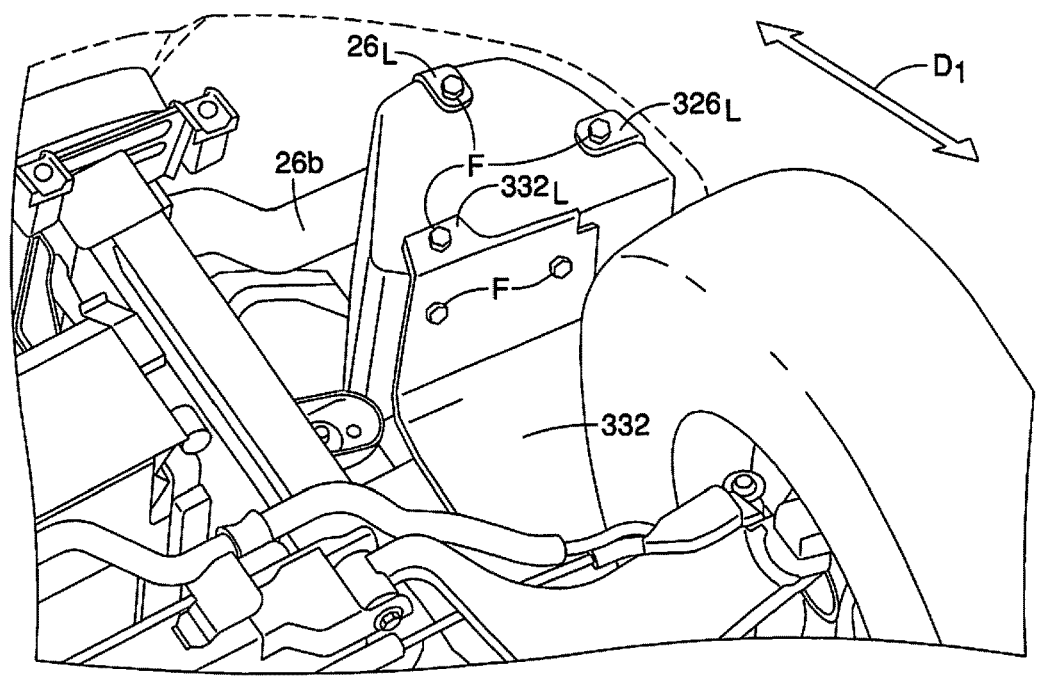
FIG. 26 is another perspective view of the vehicle viewing upward and forward with the bumper and the fender removed showing details of the support bracket and a wheel well skirt that also supports the floating energy transmitting element in accordance with the fourth embodiment.

As shown in FIGS. 23-25, the modified second support bracket 326 includes features from the first embodiment such as the inboard end 26a, the first section 26b, the second section 26c, the upper flange $26_U$ and the lower flange $26_L$. Additionally, the second support bracket 326 includes a third section 326d that extends in a rearward direction from the second section 26c. The third section 326d is attached to the lateral outboard surface of the floating energy transmitting element 14. The third section 326d also includes a second upper flange $326_U$ and a second lower flange $326_L$. The second upper flange $326_U$ is attached to the top surface of the floating energy transmitting element 14 and the second lower flange $326_L$ is attached to the bottom surface of the floating energy transmitting element 14.

Further, the wheel well skirt 332 extends downward below the floating energy transmitting element 14 and includes a lower flange $332_L$ that is attached to the bottom surface of the floating energy transmitting element 14.

The vehicle body structures 12 (other than the structures directly attached to the floating energy transmitting element 14) are conventional components that are well known in the art. Since vehicle body structures are well known in the art, these structures will not be discussed or illustrated in detail herein. Rather, it will be apparent to those skilled in the art from this disclosure that the components can be any type of structure and/or programming that can be used to carry out the present invention.

Fifth Embodiment

Figure 27:
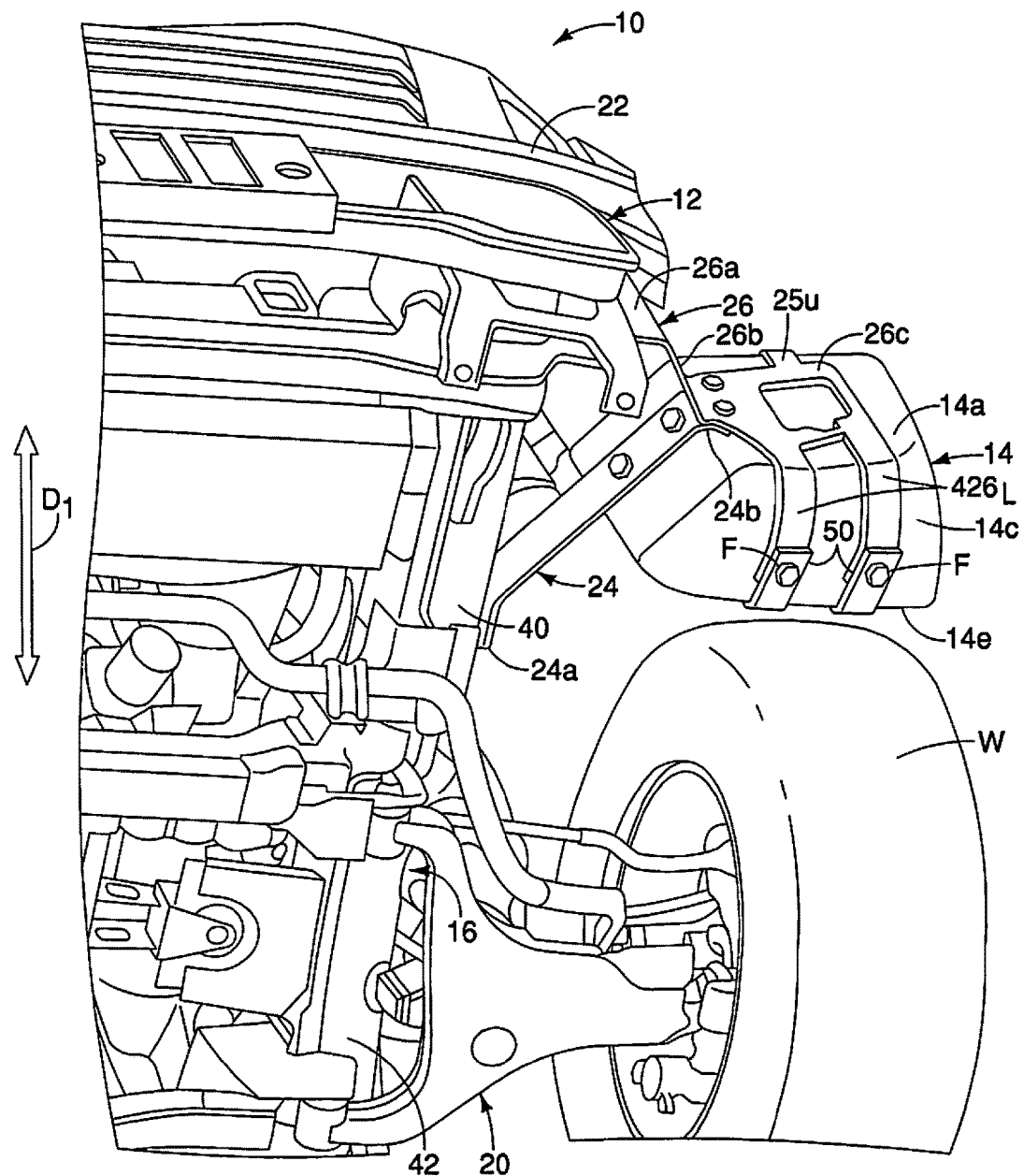
FIG. 27 is a perspective view of the vehicle viewing upward with the bumper and the fender removed showing details of support brackets and the floating energy transmitting element in accordance with a fifth embodiment.

Referring now to FIG. 27, the floating energy transmitting element 14 installed in the vehicle 10 in accordance with a fifth embodiment will now be explained. In view of the similarity between the first and fifth embodiments, the parts of the fifth embodiment that are identical to the parts of the first embodiment will be given the same reference numerals as the parts of the first embodiment. Moreover, the descriptions of the parts of the fifth embodiment that are identical to the parts of the first embodiment may be omitted for the sake of brevity.

In the fifth embodiment, the second bracket 26 has been modified to include two lower flanges $426_L$ that extend further than the lower flange $26_L$ of the first embodiment. Further, the lower flanges $426_L$ overlap the straps 50 and are fixed to the straps 50 and to the floating energy transmitting element 14 by fasteners F.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle body structure. Accordingly, these terms, as utilized to describe the present invention should be interpreted relative to a vehicle equipped with the vehicle body structure.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:
1. A vehicle body structure, comprising:
   a frame element extending forward from a passenger compartment area of a vehicle and extending in a vehicle longitudinal direction relative to the vehicle;
   a wheel rotatably supported to the frame element;

a bumper attached to a front portion of the frame element, the bumper having a lateral side portion extending in an outboard direction relative to the frame element;

a first support bracket extending from the frame element;

a floating energy transmitting element attached to the first support bracket at a location outboard of and spaced apart from the frame element, adjacent to but spaced apart from the bumper, and forward of and spaced apart from the wheel such that in response to an impact event with the bumper being contacted by another object at a location outboard of the frame element, the floating energy transmitting element is contacted by the bumper and is moved rearward contacting the wheel; and a wheel well skirt supported to the frame element via a plurality of body structures, the wheel well skirt extending above the wheel and further connecting to a rearward portion of the floating energy transmitting element.

2. The vehicle body structure according to claim 1, further comprising a sill structure connected to the frame element, and the floating energy transmitting element has a wheel contacting surface configured to direct movement of the wheel to the sill structure in response to the impact event.

3. The vehicle body structure according to claim 2, wherein the wheel contacting surface extends in a direction that is perpendicular to the vehicle longitudinal direction.

4. The vehicle body structure according to claim 2, wherein the wheel contacting surface defines an acute angle relative to the vehicle longitudinal direction such that in response to the impact event off-center steering of the wheel is restricted.

5. The vehicle body structure according to claim 2, wherein the wheel contacting surface defines an obtuse angle relative to the vehicle longitudinal direction such that in response to the impact event off-center steering of the wheel is restricted.

6. The vehicle body structure according to claim 1, wherein the floating energy transmitting element is made of a foam material having a predetermined density attenuated for transmitting impact energy.

7. The vehicle body structure according to claim 1, wherein the first support bracket has an inboard end, a central portion and an outboard end, the inboard end being attached to the frame element, the outboard end being attached to the floating energy transmitting element, and the central portion defining an angle defined relative to the frame element that is between 30 and 50 degrees.

8. The vehicle body structure according to claim 1, wherein the lateral side portion of the bumper has a curved contour that covers and at least partially conceals an outboard surface of the floating energy transmitting element.

9. The vehicle body structure according to claim 1, wherein the wheel rotatably is supported to the frame element by a front wheel suspension assembly pivotally supported to the frame element rearward of the floating energy transmitting element.

10. The vehicle body structure according to claim 1, further comprising a fender stay supported to the frame element at a location above and rearward of the floating energy transmitting element, and at least one strap element that extends downward from the fender stay attaching to a rearward portion of the floating energy transmitting element.

11. A vehicle body structure, comprising:

a frame element extending forward from a passenger compartment area of a vehicle and extending in a vehicle longitudinal direction relative to the vehicle;

a wheel rotatably supported to the frame element;

a bumper attached to a front portion of the frame element, the bumper having a lateral side portion extending in an outboard direction relative to the frame element;

a first support bracket extending from the frame element;

a floating energy transmitting element attached to the first support bracket at a location outboard of and spaced apart from the frame element, adjacent to but spaced apart from the bumper, and forward of and spaced apart from the wheel such that in response to an impact event with the bumper being contacted by another object at a location outboard of the frame element, the floating energy transmitting element is contacted by the bumper and is moved rearward contacting the wheel; and a second support bracket having an inboard end, a first section and a second section, the inboard end being attached to front portion of the frame element adjacent to the bumper, the first section extending rearward from the inboard end, the second section extending from the first section in an outboard direction away from the frame element and the second section being attached to a forward surface of the floating energy transmitting element and the first support bracket.

12. The vehicle body structure according to claim 11, wherein the second support bracket includes a third section that extends in a rearward direction from the second section, the third section being attached to an outboard surface of the floating energy transmitting element.

13. A vehicle body structure, comprising:

a frame element extending forward from a passenger compartment area of a vehicle and extending in a vehicle longitudinal direction relative to the vehicle;

a sill structure connected to the frame element;

a wheel rotatably supported to the frame element forward of the sill structure;

a bumper attached to a front portion of the frame element, the bumper having a lateral side portion extending in an outboard direction relative to the frame element;

a first support bracket extending from the frame element;

a second support bracket having an inboard end, a first section and a second section, the inboard end being attached to front portion of the frame element adjacent to the bumper, the first section extending rearward from the inboard end, the second section extending from the first section in an outboard direction away from the frame; and a floating energy transmitting element having a forward surface, a lateral outboard surface and a wheel contact surface facing rearward, the forward surface being attached to the first support bracket and the second section of the second support bracket at a location outboard of and spaced apart from the frame element, the floating energy transmitting element being located adjacent to but spaced apart from the bumper, and forward of and spaced apart from the wheel such that in response to an impact event with the bumper being contacted by another object at a location outboard of the frame element, the wheel contact surface of the floating energy transmitting element is moved rearward contacting the wheel via impact energy received from the bumper with the wheel contacting surface directing movement of the wheel in response to the impact event.

14. The vehicle body structure according to claim 13, wherein
the second support bracket includes a third section that extends in a rearward direction from the second section, the third section being attached to an outboard surface of the floating energy transmitting element.

15. The vehicle body structure according to claim 14, further comprising
a fender stay supported to the frame element at a location above and rearward of the floating energy transmitting element, and
at least one strap element that extends downward from the fender stay attaching to a rearward portion of the floating energy transmitting element.

16. The vehicle body structure according to claim 13, further comprising
a wheel well skirt supported to the frame element via a plurality of body structures, the wheel well skirt extending above the wheel and further attaching to a rearward portion of the floating energy transmitting element.

17. The vehicle body structure according to claim 13, wherein
the wheel contacting surface extends in a direction that is perpendicular to the vehicle longitudinal direction.

18. The vehicle body structure according to claim 13, wherein
the wheel contacting surface defines an acute angle relative to the vehicle longitudinal direction such that in response to the impact event off-center steering of the wheel is restricted.

19. The vehicle body structure according to claim 13, wherein
the wheel contacting surface defines an obtuse angle relative to the vehicle longitudinal direction such that in response to the impact event off-center steering of the wheel is restricted.

* * * * *